(12) United States Patent
Pritchard et al.

(10) Patent No.: US 10,023,041 B1
(45) Date of Patent: Jul. 17, 2018

(54) ELECTRIC DRIVE SYSTEM FOR INDEPENDENT WHEEL DRIVE

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/595,144

(22) Filed: May 15, 2017

(51) Int. Cl.
*B60K 6/365* (2007.10)
*B60K 6/48* (2007.10)
*B60K 6/445* (2007.10)
*B60W 10/08* (2006.01)
*B60K 6/547* (2007.10)
*B60W 20/00* (2016.01)
*F16H 57/08* (2006.01)
*F16H 1/28* (2006.01)

(52) U.S. Cl.
CPC ............... *B60K 6/365* (2013.01); *B60K 6/48* (2013.01); *B60K 6/445* (2013.01); *B60K 6/547* (2013.01); *B60W 10/08* (2013.01); *B60W 20/00* (2013.01); *F16H 1/28* (2013.01); *F16H 57/082* (2013.01)

(58) Field of Classification Search
None
See application file for complete search history.

(56) References Cited

U.S. PATENT DOCUMENTS

| | | | | |
|---|---|---|---|---|
| 3,055,448 A | * | 9/1962 | Fagel | B60K 17/145 180/10 |
| 4,406,340 A | * | 9/1983 | Gennaux | H02K 7/102 180/60 |
| 6,592,486 B1 | * | 7/2003 | Arbanas | B60K 6/365 475/107 |
| 9,657,826 B1 | * | 5/2017 | Morgan | B60K 1/00 |
| 2010/0140020 A1 | * | 6/2010 | Murahashi | B60B 11/06 184/6.12 |
| 2011/0094807 A1 | * | 4/2011 | Pruitt | B60K 1/04 180/65.6 |
| 2012/0103708 A1 | * | 5/2012 | Hennings | B60K 7/0007 180/65.6 |
| 2012/0118652 A1 | * | 5/2012 | Yamamoto | B60K 6/405 180/65.6 |
| 2012/0217073 A1 | * | 8/2012 | Drum | F16N 7/40 180/62 |

* cited by examiner

*Primary Examiner* — Justin Holmes
(74) *Attorney, Agent, or Firm* — Bejin Bieneman PLC

(57) ABSTRACT

A drive unit includes a housing, a main shaft, an output shaft, an electric motor, a first planetary gear set, and a second planetary gear set. The main shaft is rotatably disposed in the housing, and with the housing cooperatively defines an axis of rotation. The output shaft is disposed at least in part in the housing and is rotatable about the axis. The electric motor is disposed in the housing and has a rotor centered on and rotatable about the axis. The first planetary gear set is centered on the axis and provides a first speed reduction ratio between the rotor and a second planetary gear set. The second planetary gear set provides a second speed reduction ratio between the first planetary gear set and the output shaft.

17 Claims, 4 Drawing Sheets

ELECTRIC DRIVE SYSTEM FOR INDEPENDENT WHEEL DRIVE

BACKGROUND

A hybrid internal combustion-electric powertrain may include a plurality of electric motors in combination with an internal combustion engine. A first or primary electric motor may be used in series or alternatively in parallel with the internal combustion engine to provide power to either the front wheels or rear wheels of a vehicle. A supplemental drive system may be employed to provide power to the wheels not getting power from the internal combustion engine. The supplemental system may include a drive unit for each wheel, with each unit further including an electric motor and a gear set disposed between the electric motor and the associated wheel. Known supplemental drive units may have a limited operating cycle time period. It is desirable to provide a supplemental electric drive system with drive units suited for operating for sustained periods of time that may be accommodated within an available space of a vehicle.

DETAILED DESCRIPTION

Figure 1:
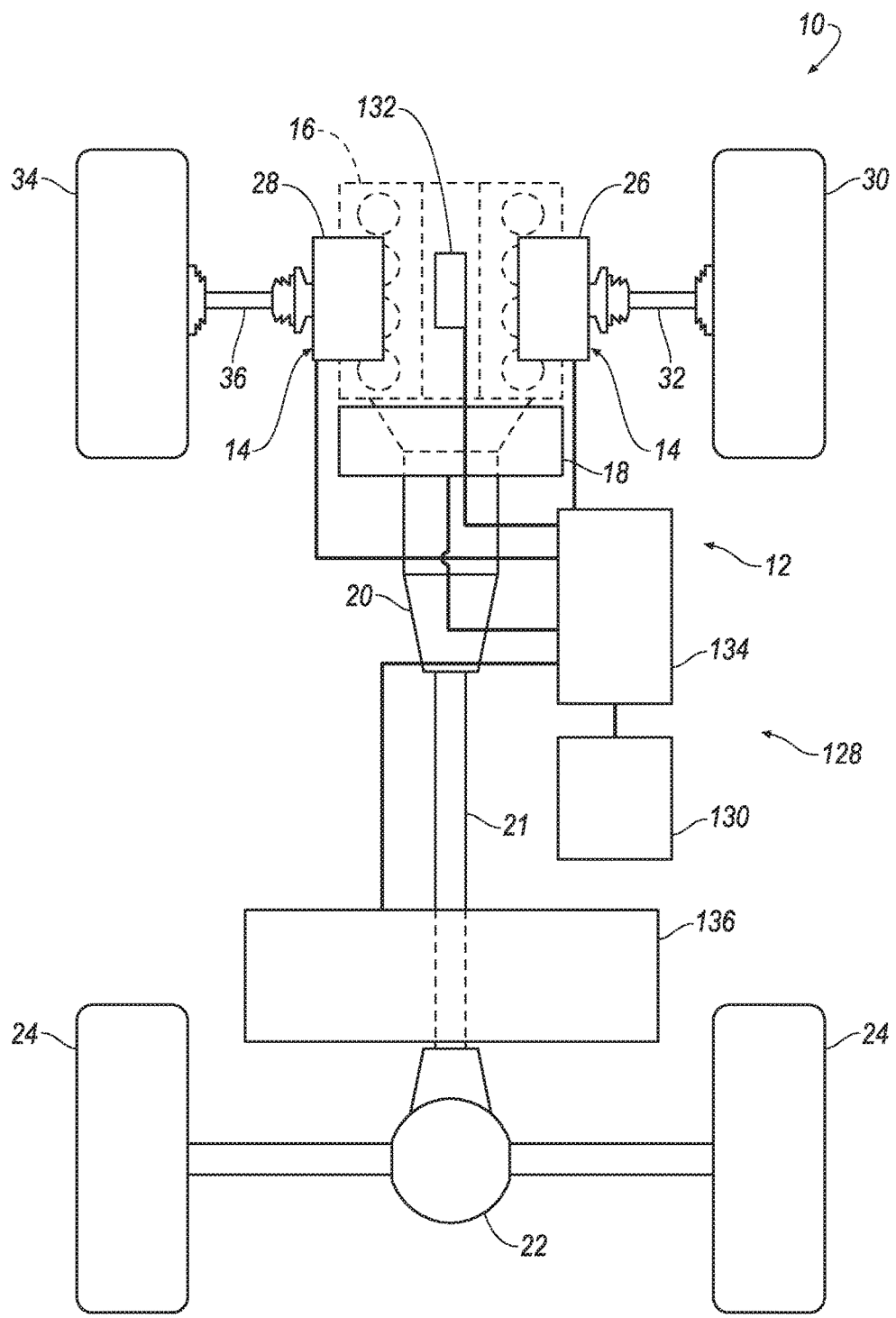
FIG. 1 is a schematic plan view of an example hybrid electric-IC powertrain supplemented by an example compact electric drive.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A drive unit includes a housing, a main shaft, an output shaft, an electric motor, a first planetary gear set, and a second planetary gear set. The main shaft is rotatably disposed in the housing, and with the housing cooperatively defines an axis of rotation. The output shaft is disposed at least in part in the housing and is rotatable about the axis. The electric motor is disposed in the housing and has a rotor centered on and rotatable about the axis. The first planetary gear set is centered on the axis and provides a first speed reduction ratio between the rotor and a second planetary gear set. The second planetary gear set provides a second speed reduction ratio between the first planetary gear set and the output shaft.

The first planetary gear set may include a ring gear fixed to the rotor and a planet carrier fixed to the housing and a sun gear fixed to the main shaft.

The motor may include a stator fixed to and disposed within the housing. The rotor may include a ring, a hub and a flange. The ring may be disposed radially within the stator. The hub may be rotatably disposed over the main shaft. The flange may extend radially between and fixedly connect the hub and the ring. The ring gear may be fixed to the rotor ring. The ring gear and the sun gear and the planet gears of the first planetary gear set may be all axially disposed between the rotor flange and an inboard edge of the rotor ring.

The second planetary gear set may include a sun gear fixed to the main shaft and a ring gear fixed to the housing and a planet carrier fixed to the output shaft.

The housing may be formed in part by an engine oil pan.

A lubricant for the gear sets may be engine oil.

A stator of the motor may be liquid cooled.

A vehicle may include an internal combustion engine and a drive system. The internal combustion engine may have an engine oil pan. The drive system may include first and second drive units, each drive unit connecting with a driving wheel. Each drive unit may include a housing, a main shaft, an output shaft, an electric motor, a first planetary gear set, and a second planetary gear set. The housing may be connected to the engine oil pan. The main shaft may be rotatably disposed in the housing. The housing may cooperative define an axis of rotation. The output shaft may be disposed at least in part in the housing and is rotatable about the axis. The electric motor may be disposed in the housing and may have a rotor centered on and rotatable about the axis. The first planetary gear set is centered on the axis and provides a first speed reduction ratio between the rotor and a second planetary gear set. The second planetary gear set provides a second speed reduction ratio between the first planetary gear set and the output shaft.

As illustrated in FIG. 1, an example motor vehicle 10 may include a hybrid powertrain 12 supplemented by a compact electric drive system 14.

The example hybrid powertrain 12 may include an internal combustion engine 16, an electric motor 18, i.e., an electric motor-generator 18, a gear-change transmission 20, a propeller shaft 21, an axle 22 including a differential, and rear wheels 24 connected to the axle 22.

Figure 2:
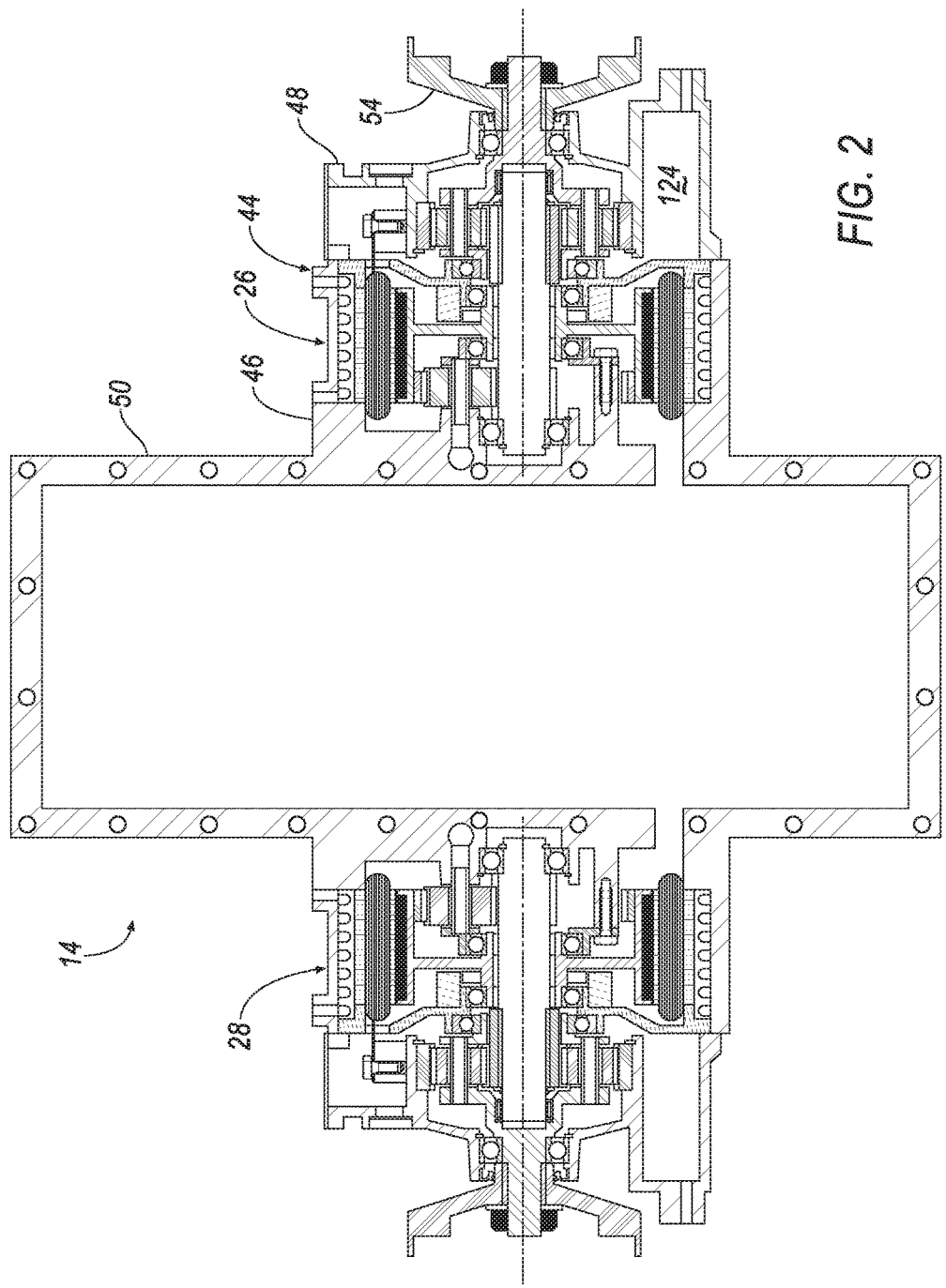
FIG. 2 is a section view of the compact electric drive of FIG. 1.

With reference to FIG. 2, the compact drive system 14 may include a right-hand drive unit 26 and a left-hand drive unit 28. Each drive unit 26, 28 is substantially a mirror image of the other. The right-hand drive unit 26 is connected to a right front driving wheel 30 by a right front half-shaft 32. Similarly, the left-hand drive unit 28 is connected to a left front driving wheel 34 by a right front half-shaft 36. Consistent with a common configuration of half-shafts, the right and left front half-shafts may each include an inboard constant velocity joint and an outboard constant velocity joint.

Figure 3:
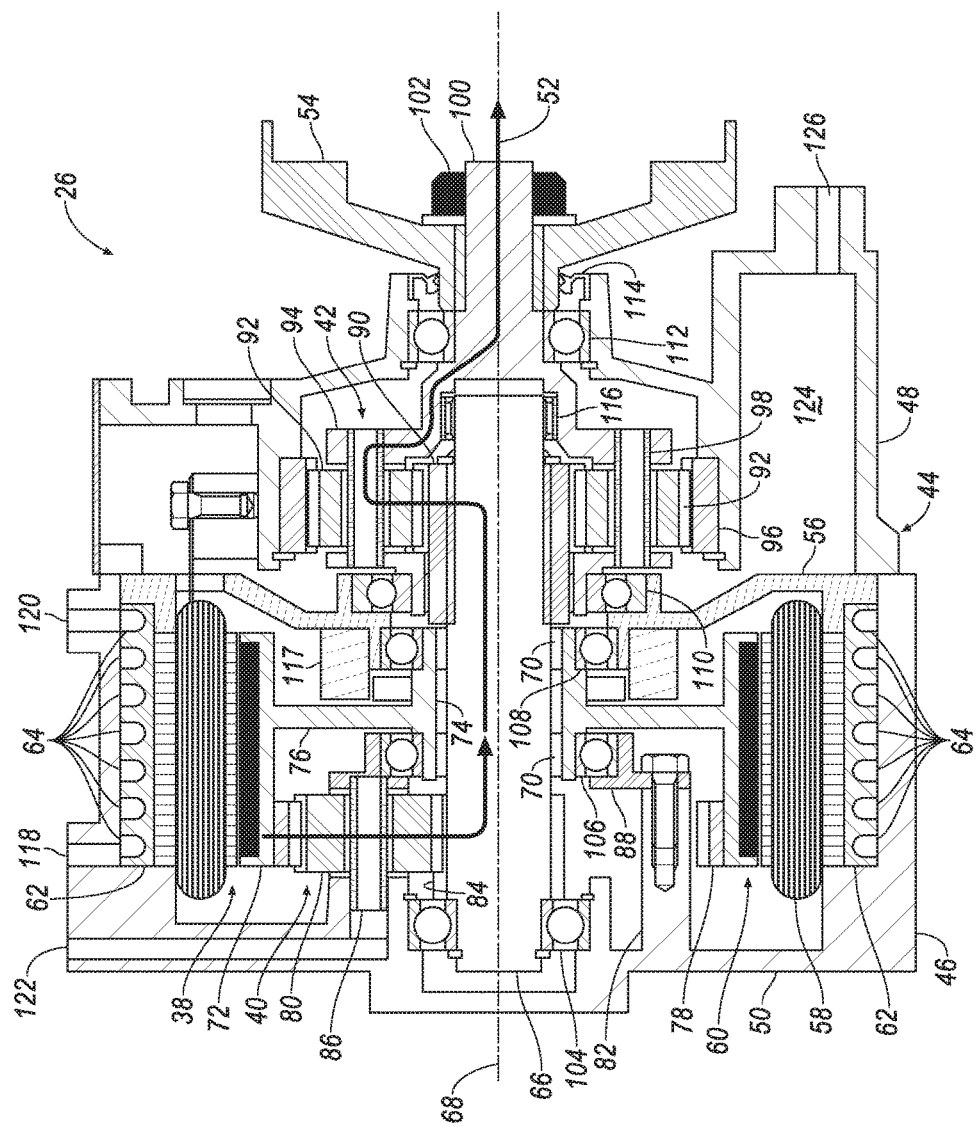
FIG. 3 is an enlarged view of an example right-hand drive unit of the electric drive of FIG. 2.

With reference to FIG. 3, the right-hand drive unit 26 is described below in more detail. As noted above, the left-hand drive unit 28 is substantially a mirror image of the right-hand drive unit. As such, the description of the right-hand drive unit 26 is applicable to the left-hand drive unit 28.

The drive unit 26 includes a drive unit electric motor 38, i.e., an electric motor-generator 38, and may include a first reduction gear set 40 and a second reduction gear set 42. The electric motor 38 and the gear sets 40 and 42 are disposed within a right-hand compact drive unit housing 44. The housing 44 includes an inner housing 46 and an outer housing 48. The inner housing 46, defining an inboard portion of the housing 48, may be formed as part of an engine oil pan 50 of the internal combustion engine 16, as illustrated in FIGS. 2 and 3, or may be otherwise fixedly connected to the engine oil pan 50. The right-hand drive unit outer housing 48 may be fixed to an outboard side of the inner housing 46. The inner housing 46 and the outer housing 48 cooperatively protectively enclose and support the motor 38 and the gear sets 40, 42.

The gear sets 40 and 42 are disposed in a power-flow path 52 between the motor 38 and a right-hand output flange 54. The right-hand output flange 54 connects to the right-hand half shaft 32.

An intermediate wall 56 may be disposed between the motor 38 and the second reduction gear set 42.

The motor 38 includes a stator 58 and a rotor 60. The stator 58 is fixed to and disposed within the housing 44. The stator 58 may be surrounded by or incorporate a liquid-cooled cooling jacket 62. The cooling jacket 62 may include coolant passages 64 for liquid coolant. Electric motors having liquid cooled cooling jackets are known and are commercially available. One company selling liquid-cooled electric motors is WEG Electric Corp.

The rotor 60 is rotatably disposed on a main shaft 66. The main shaft 66 and the housing 44 cooperatively define an axis of rotation 68 about which shaft 66 and the rotor 60 rotate. Bearings, e.g., needle roller bearings 70, may be radially disposed between the main shaft 66 and the rotor 60.

The rotor 60 may include a magnet-retaining rotor ring 72 at an outer diameter of the rotor 60, a rotor hub 74 at a center of the rotor 60, and a rotor flange 76 disposed between and connecting the hub 74 and the ring 72. The ring 72 is disposed radially within the stator 58. The bearings 70 are radially disposed between the hub 74 and the main shaft 66.

The first reduction gear set 40 is disposed between and drivingly connects the rotor 60 and the main shaft 66. The example gear set 40 illustrates one approach to providing a speed reduction ratio between the rotor 60 and the second reduction gear set 42. The first reduction gear set 40 is a planetary gear set, including a first ring gear 78, a plurality of first planet gears 80 retained by a first planet carrier 82, and a first sun gear 84. The ring gear 78 is fixed to the rotor ring 72 for unitary movement therewith. As illustrated, the ring gear 78 is fixed directly to the ring 72, but may alternatively connect to the ring through an intermediate member, e.g., the flange 76. The sun gear 84 may be formed as part of the main shaft 66, or alternatively may be pressed on or otherwise fixed to the shaft 66 for unitary movement therewith. The planet gears 82 are radially disposed between the ring gear 78 and the sun gear 84, with teeth of the planet gears 82 meshing with teeth of each of the ring gear 78 and the sun gear 84. Each planet gear 80 is rotatably mounted on a first planet shaft 86. The planet shafts 86 are fixed to the carrier 82. The first carrier 82 is fixed relative to the housing 44. The carrier 82 may be formed in part by the inner housing 46. A second part of the carrier 82 may be provided by a first carrier bracket 88 that is fixed to the inner housing 46. The first reduction gear set 40 is centered on the axis 68, i.e., the ring gear 78, the sun gear 84, and a diameter on which the planet shafts 86 are located, are all centered on the axis 68. The first reduction gear set 40 is disposed in substantially its entirety, both radially and axially, within the rotor ring 72 on an inboard side of the flange 76, i.e., the ring gear 78, the sun gear 84 and the planet gears 80 are all axially disposed between the rotor flange 76 and an inboard edge 89 of the rotor ring 72. This arrangement contributes to allowing an axially compact power flow path 52 and drive unit 26.

The second reduction gear set 42 is disposed between and drivingly connects the main shaft 66 and the output flange 54. The second reduction gear set 42 is a planetary gear set, including a second sun gear 90, a plurality of second planet gears 92 retained by a second planet carrier 94, and a second ring gear 96. The example sun gear 90 is fixed to the main shaft 66 for unitary rotation therewith. The sun gear 90, is formed separately from the main shaft and fixed thereto, but may alternatively be formed integrally therewith. The second ring gear 96 is fixed to the outer housing 48, preventing the ring gear 96 from rotating. The planet gears 92 are radially disposed between the sun gear 90 and the ring gear 96, with teeth of the planet gears 92 meshing with teeth of each of the sun gear 90 and the ring gear 96. Each planet gear 92 is rotatably mounted on a second planet shaft 98. The planet shafts 98 are fixed to the second carrier 94. The carrier 94 may include web members, not shown, providing a rigid connection between an inboard side of the carrier 94 and an outboard side of the carrier. The carrier may be fixed on its outboard side to, e.g., formed as a unit with, a splined output shaft 100, disposed at least in part in the housing 44. The flange 54 may have a splined hub that slides over the output shaft 100. The splines of the flange 54 and the shaft 100 mesh to prevent relative rotation. A retaining nut 102 may be disposed on a threaded end of shaft 100 to retain the flange on the shaft 100. The second reduction gear set 42 is centered on the axis 68, i.e., the ring gear 96, the sun gear 90, and a diameter on which the planet shafts 98 are located, are all centered on the axis 68. The example gear set 42 illustrates one approach to providing a speed reduction ratio between the first planetary gear set 40 and the output shaft 100.

A plurality of bearings, e.g., ball bearings, may be used to maintain all of the rotating parts of the unit 26, i.e., the shaft 66 and the sun gears 84, 90 thereon, the rotor 60, the second carrier 94 and the flange 54 fixed thereto, centered for rotation about the axis 68. Such bearings may include an inboard main shaft support bearing 104 with an outer race disposed in a pocket in the inner housing 46. A first carrier-to-rotor bearing 106 may be radially disposed between the first carrier 82 and the rotor hub 74. A rotor-to-intermediate wall bearing 108 is radially disposed between the rotor hub 74 and a first axially extending lip of the intermediate wall 56. A second carrier-to-intermediate wall bearing 110 is radially disposed between a second axially extending lip of the intermediate wall 56 and a hub of the second carrier 94. A second carrier support bearing 112 is disposed between an outboard hub of outer housing 48 and a bearing retention portion of the output shaft 100. An output seal 114 disposed outboard of the bearing 112 may be in the form of a lip seal. A main shaft support bearing 116 between an outboard end of the main shaft 66 and a bore inside an outboard side of the second carrier 94 may be a needle roller bearing.

A motor resolver 117 that may be used to control the motor 38 may be fixed to the first axially extending lip of the intermediate wall 56. The resolver may be radially outward of the lip and the bearing 108.

Coolant may be provided to passages 64 by a coolant inlet 118 that may be formed in the inner housing 46. Coolant may exit the passages 64 by passing through a coolant outlet 120 that may also be formed in the inner housing 46. The coolant may be coolant from a cooling system for the internal combustion engine. Alternative, the coolant may be another fluid used exclusively for cooling the electric motors of the drive units 26 and 28.

A lubricant for lubricating engaging surfaces of gear teeth and the bearings may be received through a lubricant inlet 122. The lubricant may pass through a lubrication circuit that may include channels and orifices directing the lubricant to desired areas. The force of gravity may be used to aid in directing a flow of the lubricant. The lubrication circuit may guide the lubricant to a lubricant sump 124 at a bottom of the housing 44. The example lubricant sump 124 is found at a bottom of the outer housing 48. A lubricant outlet 126 allows the lubricant to return to a lubricant pump. The lubricant may be engine lubrication oil. The use of engine lubrication oil may be facilitated by using the oil pan 50 to form the inner housing 46. The use of engine oil as the lubricant would also allow an oil pump within the engine 16 to supply the lubricant to the drive units, avoiding a need to provide a separate pump and fluid distribution system for the drive units 26, 28. Alternatively, when the transmission 20 is an automatic transmission equipped with a fluid pump, the lubricant may be transmission fluid provided by connecting a pressure line (not shown) from the transmission 20 to the lubricant inlets 122 of units 26, 28. The transmission fluid would be returned to the transmission 20 by way of a connecting conduit between the lubricant outlet 126 and the transmission 20. Yet alternatively, the compact drive system 14 may have a separate lubrication system with its own pump to lubricate drive units 26 and 28.

Referring again to FIG. 1, a power management system 128 may include an electronic control unit 130, an engine controller 132, a power electronics unit 134, and a vehicle battery 136. Although not shown, the power management system 128 may also include a high voltage power bus, e.g., 300 volts direct current, a low voltage power bus, e.g., 12 volts direct current, and an electronic communication bus. Electronic communications may alternatively be made wirelessly, as by, e.g., Bluetooth technology.

The electronic control unit 130 may comprise a computing device including a memory for storing data and commands including system logic and a processor for executing commands. The electronic control unit 130 may be programmed to operate each of the hybrid powertrain 12 and the compact drive system 14, and to coordinate operation of the hybrid powertrain 12 and the compact drive system 14.

The vehicle battery 136 may be a high voltage battery, e.g., 300 volts direct current.

The power electronics unit 134 may include a first transformer to convert the direct current electrical power from the battery to three phase alternating current for use by the motors 38 of each of the drive units 26, 28 and the electric motor 18. The power electronics unit 134 may also include a second transformer to convert 300 volts direct current to 12 volts direct current. Alternatively, the power management system 128 may additionally include a low voltage, e.g., 12 volts, battery. The power electronics unit 134 may be responsive to commands from the electronic control unit 130.

The engine controller 132 may include a plurality of actuators and sensors for managing airflow, fueling and engine ignition, and ultimately the torque and rotational speed of the engine 16. Such actuators and sensors, e.g., throttle bodies, fuel injectors, mass airflow sensors, and crankshaft position sensors, are known.

In operation, the electronic control unit 130 may be programmed to actuate the compact drive system 14 to drive the front wheels 30, 34 independent of whether the rear wheels 24 are being driven. The actuation of the compact drive system 14 may also be coordinated with actuation of the powertrain 12 and driving of the rear wheels 24. An example of a vehicle maneuver that may benefit from coordination of by the electronic control unit 130 of the hybrid powertrain 12 and the compact drive system 14 is torque vectoring in an all-wheel drive mode of operation. An example of a vehicle maneuver that may be executed by the compact drive unit independent of the hybrid powertrain 12, i.e., without drive torque contribution from the hybrid powertrain 12, is parallel parking.

When one of the drive units 26, 28 is called on to provide a drive torque, each responds in substantially the same manner. A description of the operation of the right-hand drive unit 26 is applicable to the operation of the left-hand drive unit 28.

The drive unit 26 may be continuously supplied during operation of the vehicle 10 with lubrication fluid and liquid coolant as described above. A rotational speed of the rotor 60 may depend on vehicle operating conditions including a velocity of the vehicle 10 and a steering angle of the front wheels 30, 34. The rotor 60 may be back-driven by a rotation of the wheel 30. Similarly, when the wheel 30 is not rotating, the rotor 60 is not rotating.

A command from the electronic control unit 130 may direct the power electronics unit to supply electrical power to the motor 38. Responsive to the power input, a torque develops between the stator 58 and the rotor 60. The rotor 60, responsive to the torque, and if not already rotating, begins to rotate when the torque overcomes the resistance of the vehicle, including frictional drag and vehicle inertia.

Torque from the motor 38 follows the power flow path 52. The first ring gear 78 rotates as a unit with the rotor 60. The planet gears 80 are driven by the first ring gear 78. The planet gears, mounted to the stationary carrier 82, act as idler gears between the ring gear 78 and the first sun gear 84. The main shaft 66, fixed to the sun gear 84, rotates at the same speed as the sun gear 84. A rotative speed $\omega_{MS}$ of the main shaft 66 may be calculated as a function of a rotative speed $\omega_R$ of the rotor 60 based on a number of teeth $N_{R1}$ on the first ring gear 78 and a number of teeth $N_{S1}$ on the first sun gear 84. The resulting equation, with the negative sign indicating a change in a direction of rotation, is:

$$\omega_{MS} = \omega_R * (N_{S1}/N_{R1}). \tag{1}$$

Continuing along the path 52, as the main shaft 66 rotates, the second sun gear 90 rotates at the same speed, driving the second planet gears 92. With the second ring gear 96 fixed to the outer housing 48 and the second carrier 94 free to rotate, the planet gears 92 rotate on shafts 98 while at the same time orbiting about the axis 68 with the second carrier 94. A rotative speed of the second carrier 94, equal to a rotative speed $\omega_{SS}$ of the output shaft 100, may be calculated as a function of the rotative speed $\omega_{MS}$ of the main shaft 66 based on a number of teeth $N_{S2}$ on the second sun gear 90 and a number of teeth $N_{R2}$ on the second ring gear 96. The resulting equation is:

$$\omega_{SS} = \omega_{MS} * (N_{S2}/(N_{S2}+N_{R2})). \tag{2}$$

A value of the output shaft speed W relative to the rotor speed $\omega_R$ may be determined by substituting the value of the main shaft speed $\omega_{MS}$ of equation (1) into equation 2:

$$\omega_{SS} = -\omega_R * (N_{S1}/N_{R1}) * (N_{S2}/(N_{S2}+N_{R2})) \tag{3}$$

Figure 4:
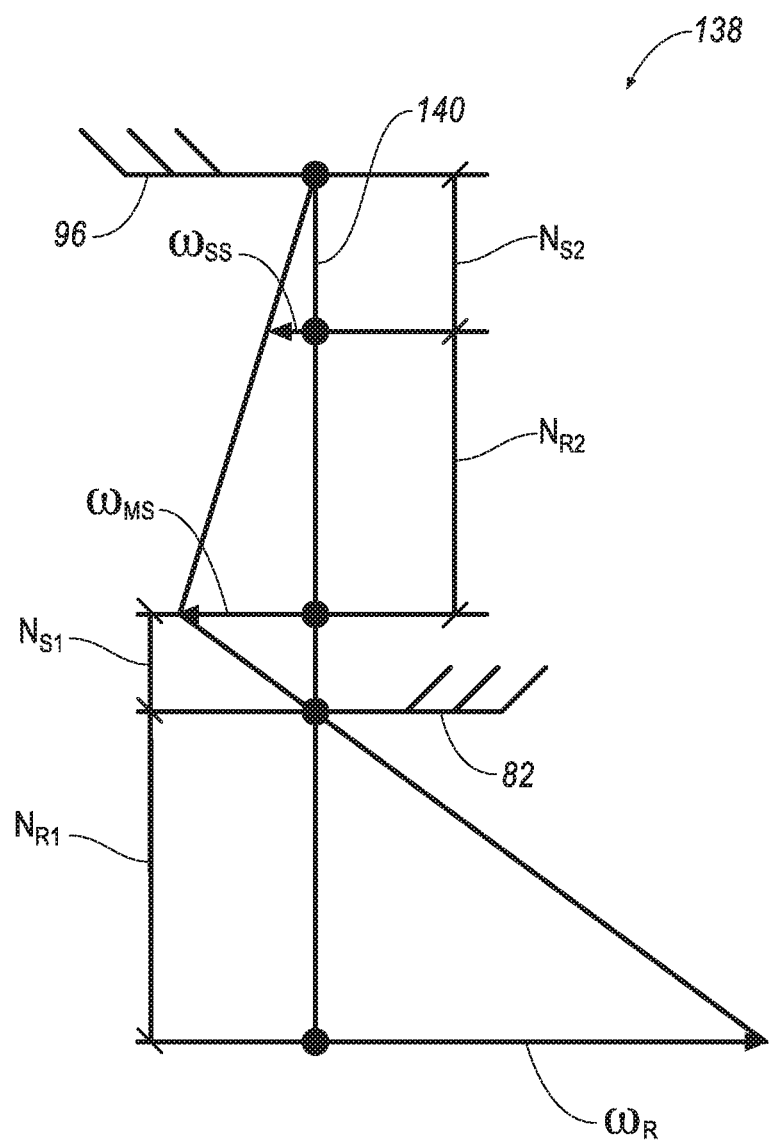
FIG. 4 is a stick diagram of an example powerflow.

Referencing FIG. 4, the relationship of equations (1), (2) and (3) is illustrated in a power flow stick diagram 138. A vertical axis 140 is used to indicate the number of teeth $N_{S1}$, $N_{R1}$, $N_{S2}$ and $N_{R2}$ on the gears 84, 78, 90, and 96. Horizontal lines are used to represent the relative rotational speeds $\omega_R$, $\omega_{MS}$, and $\omega_{SS}$. Speeds for each of the non-rotating first carrier 82 and second ring gear 96 are shown as zero. The magnitude of the rotational speed increases with the distance of the arrowhead tip from the axis 140. A direction of the arrowheads indicates the relative direction of rotation. The diagram 138 clearly illustrates that the speed $\omega_R$ is first reduced by the first gear set 40 to the speed $\omega_{MS}$ which is reduced further by the second gear set 42 to the speed $\omega_{SS}$. Given that an effect of the gear sets 40, 42 on torque is the multiplicative inverse of the effect of the gear sets 40, 42 on speed, the diagram also clearly illustrates that the gear sets 40, 42 increase the torque at the output shaft 100 relative to the torque at the rotor 60.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A drive unit comprising:
   a housing;
   a main shaft rotatably disposed in the housing and with the housing cooperatively defining an axis of rotation;
   an output shaft disposed at least in part in the housing and rotatable about the axis;
   an electric motor disposed in the housing and having a rotor centered on and rotatable about the axis;
   a first planetary gear set centered on the axis and providing a first speed reduction ratio between the rotor and a second planetary gear set and including a first ring gear fixed to the rotor and a first planet carrier fixed to the housing and a first sun gear fixed to the main shaft; and
   the second planetary gear set providing a second speed reduction ratio between the first planetary gear set and the output shaft.

2. The drive unit of claim 1, wherein:
   the motor includes a stator fixed to and disposed within the housing;
   the rotor includes:
      a ring disposed radially within the stator,
      a hub rotatably disposed over the main shaft, and
      a rotor flange extending radially between and fixedly connecting the hub and the ring; and
   the first ring gear is fixed to the first rotor ring, and the first ring gear and the first sun gear and a plurality of first planet gears of the first planetary gear set are all axially disposed between the rotor flange and an inboard edge of the rotor ring.

3. The drive unit of claim 1, wherein the second planetary gear set includes a second sun gear fixed to the main shaft and a second ring gear fixed to the housing and a second planet carrier fixed to the output shaft.

4. The drive unit of claim 1, wherein the housing is formed in part by an engine oil pan.

5. The drive unit of claim 4, wherein a lubricant for the gear sets is engine oil.

6. The drive unit of claim 1, wherein a stator of the motor is liquid cooled.

7. A drive unit comprising:
   a housing;
   a main shaft rotatably disposed in the housing and with the housing cooperatively defining an axis of rotation;
   an output shaft disposed at least in part in the housing and rotatable about the axis;
   an electric motor disposed in the housing and having a rotor centered on and rotatable about the axis;
   a first planetary gear set centered on the axis and providing a first speed reduction ratio between the rotor and a second planetary gear set; and
   the second planetary gear set providing a second speed reduction ratio between the first planetary gear set and the output shaft and including a second sun gear fixed to the main shaft and a second ring gear fixed to the housing and a second planet carrier fixed to the output shaft.

8. The drive unit of claim 7, wherein the housing is formed in part by an engine oil pan.

9. The drive unit of claim 8, wherein a lubricant for the gear sets is engine oil.

10. The drive unit of claim 7, wherein a stator of the motor is liquid cooled.

11. A vehicle comprising:
    an internal combustion engine having an engine oil pan;
    a drive system including first and second drive units, each drive unit connecting with a driving wheel and each drive unit including:
       a housing connected to the engine oil pan;
       a main shaft rotatably disposed in the housing and with the housing cooperatively defining an axis of rotation;
       an output shaft disposed at least in part in the housing and rotatable about the axis;
       an electric motor disposed in the housing and having a rotor centered on and rotatable about the axis;
       a first planetary gear set centered on the axis and providing a first speed reduction ratio between the rotor and a second planetary gear set; and
       the second planetary gear set providing a second speed reduction ratio between the first planetary gear set and the output shaft.

12. The vehicle of claim 11, wherein the first planetary gear set includes a first ring gear fixed to the rotor and a first planet carrier fixed to the housing and a first sun gear fixed to the main shaft.

13. The vehicle of claim 12, wherein the second planetary gear set includes a second sun gear fixed to the main shaft and a second ring gear fixed to the housing and a second planet carrier fixed to the output shaft.

14. The vehicle of claim 13, wherein:
    the motor includes a stator fixed to and disposed within the housing;
    the rotor includes:
       a ring disposed radially within the stator,
       a hub rotatably disposed over the main shaft, and
       a rotor flange extending radially between and fixedly connecting the hub and the ring; and
    the first ring gear is fixed to the rotor ring, and the first ring gear and the first sun gear and a plurality of first planet gears of the first planetary gear set are all axially disposed between the rotor flange and an inboard edge of the rotor ring.

15. The vehicle of claim 11, wherein the housing is formed in part by the engine oil pan.

16. The vehicle of claim 15, wherein a lubricant for the gear sets is engine oil.

17. The vehicle of claim 11, wherein a stator of the motor is liquid cooled.

* * * * *